(12) United States Patent
Su

(10) Patent No.: US 11,310,159 B2
(45) Date of Patent: Apr. 19, 2022

(54) PACKET SENDING METHOD AND APPARATUS, AND STORAGE DEVICE

(71) Applicant: Huawei Technologies Co., Ltd., Shenzhen (CN)

(72) Inventor: Dexian Su, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 95 days.

(21) Appl. No.: 16/942,988

(22) Filed: Jul. 30, 2020

(65) Prior Publication Data

US 2020/0358701 A1 Nov. 12, 2020

Related U.S. Application Data

(63) Continuation of application No. PCT/CN2018/078172, filed on Mar. 6, 2018.

(51) Int. Cl.
*H04L 12/801* (2013.01)
*G06F 9/455* (2018.01)
(Continued)

(52) U.S. Cl.
CPC .......... *H04L 47/12* (2013.01); *G06F 9/45558* (2013.01); *G06F 13/28* (2013.01);
(Continued)

(58) Field of Classification Search
CPC ....... H04L 47/12; H04L 47/115; H04L 47/25; H04L 47/31; H04L 47/24; H04L 47/11;
(Continued)

(56) References Cited

U.S. PATENT DOCUMENTS

2004/0049601 A1* 3/2004 Boyd .................... H04L 47/193
709/250
2013/0080562 A1 3/2013 Fox et al.
(Continued)

FOREIGN PATENT DOCUMENTS

CN 102055677 A 5/2011
CN 103763213 A 4/2014
(Continued)

OTHER PUBLICATIONS

Ramakrishnan, K., et al., "A Proposal to add Explicit Congestion Notification (ECN) to IP," Request for Comments: 2481, Jan. 1999, 25 pages.
(Continued)

*Primary Examiner* — Habte Mered
(74) *Attorney, Agent, or Firm* — Conley Rose, P.C.

(57) ABSTRACT

A packet sending method is applied to a data transmission system and comprising: receiving, by a network interface card of a second device, a first packet that is from a first QP of a first device and that is forwarded by using a switch; obtaining, by the network interface card of the second device, an instant rate of the first QP and a maximum sending rate of the first QP; determining, by the network interface card of the second device, an adjustment rate of the first QP based on the instant rate of the first QP and the maximum sending rate of the first QP; sending, by the network interface card of the second device, a congestion notification packet to the first device, where the congestion notification packet carries the adjustment rate of the first QP.

20 Claims, 4 Drawing Sheets

(51) Int. Cl.
*G06F 13/28* (2006.01)
*H04L 12/825* (2013.01)
*H04L 12/833* (2013.01)
*H04L 12/933* (2013.01)
*H04L 12/861* (2013.01)
*H04L 47/12* (2022.01)
*H04L 47/11* (2022.01)
*H04L 47/25* (2022.01)
*H04L 47/31* (2022.01)
*H04L 49/103* (2022.01)
*H04L 49/90* (2022.01)

(52) U.S. Cl.
CPC ............ *H04L 47/115* (2013.01); *H04L 47/25* (2013.01); *H04L 47/31* (2013.01); *H04L 49/103* (2013.01); *H04L 49/90* (2013.01); *G06F 2009/45595* (2013.01)

(58) Field of Classification Search
CPC ................ G06F 9/45558; G06F 13/28; G06F 2009/5595
See application file for complete search history.

(56) References Cited

U.S. PATENT DOCUMENTS

| | | | |
|---|---|---|---|
| 2014/0269320 A1* | 9/2014 | DeCusatis | H04L 47/11 370/236 |
| 2015/0317280 A1* | 11/2015 | Magro | G06F 15/17331 710/301 |
| 2017/0149920 A1 | 5/2017 | Sammatshetti | |
| 2017/0208013 A1 | 7/2017 | Birke et al. | |
| 2019/0028392 A1* | 1/2019 | Drake | H04L 47/2425 |
| 2020/0334195 A1* | 10/2020 | Chen | H04L 67/1097 |

FOREIGN PATENT DOCUMENTS

| | | |
|---|---|---|
| CN | 105027506 A | 11/2015 |
| CN | 107135164 A | 9/2017 |

OTHER PUBLICATIONS

Ramakrishnan, K., "The Addition of Explicit Congestion Notification (ECN) to IP", Request for Comments: 3168, Sep. 2001, 63 pages.

* cited by examiner

PACKET SENDING METHOD AND APPARATUS, AND STORAGE DEVICE

CROSS-REFERENCE TO RELATED APPLICATIONS

This is a continuation of Int'l Patent App. No. PCT/CN2018/078172 filed on Mar. 6, 2018, which is incorporated by reference.

TECHNICAL FIELD

This disclosure relates to the field of computer technologies, and in particular, to a packet sending method and apparatus, and a storage device.

BACKGROUND

A RDMA over Converged Ethernet (RoCE) protocol is a network protocol that allows remote direct memory access (RDMA) over an Ethernet network, and is widely applied to a data transmission system. At present, there are two RoCE versions. RoCE v1 and RoCE v2. RoCE v1 is implemented based on an Ethernet link layer, and allows direct access of any two hosts in a same broadcast domain to memory data. RoCE v2 is implemented by a User Datagram Protocol (UDP) layer in an Ethernet Transmission Control Protocol/Internet Protocol (TCP/IP).

Usually, the data transmission system includes: a switch, a storage device, a server, and at least one virtual machine running on the server. Each virtual machine represents one storage access user. The storage device includes at least one disk. The disk may be an NVM Express (NVMe) disk. A read/write access request of the virtual machine to the storage device is sent, in a packet form, by a network interface card of the server to the storage device by using the switch. The switch may simultaneously receive packets of a plurality of servers in the data transmission system. In this case, the switch needs to forward these packets to the storage device through one or more ports. When detecting that wait duration of a packet in a send queue of any port connected to the storage device exceeds a preset duration, the switch determines that the port is congested. An explicit congestion notification (ECN) flag bit in the packet is changed, so that a changed ECN flag bit indicates that the port of the switch is congested. When the ECN flag bit in the packet received by the storage device indicates congestion, the storage device feeds back a congestion notification packet (CNP) to the server sending the packet. In this case, the server reduces a sending rate of the packet based on a preset rate, thereby controlling data transmission of the data transmission system and avoiding packet congestion. Although the foregoing processing method relieves the network congestion problem of the switch, reducing, at a same ratio, the rate at which the server sends a packet affects service processing capabilities of the server and the virtual machine running in the server, and extends service processing duration. This does not fundamentally resolve the network congestion problem in the data transmission system.

SUMMARY

A packet sending method, packet sending apparatus, and a storage device resolve a problem of network congestion in a data transmission system while ensuring service processing capabilities of a server and a virtual machine running on the server.

According to a first aspect, a packet sending method is applied to a data transmission system. The data transmission system includes a first device and a second device. A packet is transmitted between the first device and the second device based on a remote direct memory access RoCE protocol, the first device establishes a first queue pair (QP), and the second device establishes a first QP' associated with the first QP. The method includes: first, receiving, by a network interface card of the second device, a packet that is from the first device and that is forwarded by a switch, and obtaining an instant rate and a maximum sending rate of packet sending in the first QP; subsequently, determining an adjustment rate of the first QP based on the instant rate at which the first device sends a packet and the maximum sending rate corresponding to the first QP; and then, sending a congestion notification packet carrying the adjustment rate to the first device, to adjust the rate at which the first device sends the packet.

The instant rate of the first QP is a quantity of packets that are sent between the first QP and the first QP' within a unit time. The maximum sending rate of the first QP is a preset maximum quantity of packets that are allowed to be sent between the first QP and the first QP' within the unit time.

Further, the network interface card of the second device may obtain the instant rate of the first QP in any one of the following manners:

In a first manner, the network interface card of the second device counts a quantity of packets that are from the first QP, that are received within a unit time, and that are forwarded by using the switch, to determine the instant rate of the first QP.

Specifically, the second device pre-establishes the first QP' associated with the first QP. When the network interface card of the second device determines, based on the packet, that a port of the switch is congested, the network interface card counts the quantity of packets that belong to the first QP' and that are received within the unit time, to determine an instant rate at which the network interface card receives the packet sent by the first device, to serve as the instant rate of the first QP.

In a second manner, the first device periodically sends a rate notification packet to the second device.

Specifically, the first device periodically sends the rate notification packet to the network interface card of the second device, and the rate notification packet carries the instant rate at which the first QP sends a packet.

The network interface card of the second device may determine the maximum sending rate of the first QP in the following manner: determining the maximum sending rate of the first QP based on a type of service corresponding to the first QP.

Specifically, maximum sending rates corresponding to a QP are different due to different types of service processed by the QP. When the first QP is established between the first device and the second device, a mapping table between a type of service and a maximum sending rate may be pre-stored in the second device. When a packet is received, the maximum sending rate of the first QP may be determined based on a type of service processed by the first QP.

The adjustment rate of the first device is determined by using an instant rate of a QP and a maximum rate of a QP. In this way, a network congestion problem of the switch can be relieved, and moreover, service processing duration can be reduced while ensuring service processing capabilities of the first device and a virtual machine running on the first device.

In a possible implementation, the packet sending method further includes: when determining the adjustment rate of the first QP, in addition to the foregoing method, determining, by the network interface card of the second device, the adjustment rate by considering a priority of the first device based on a service requirement, to be specific, adjusting, based on the instant rate of the first QP, the maximum sending rate of the first QP, and the priority of the first device, a rate at which the first QP sends a packet. Different weights may be set based on different priorities of the first device in the data transmission system, to preferentially ensure that the switch processes a packet of a QP in the first device having a high priority.

In a possible implementation, when determining the adjustment rate of the first QP, the network interface card of the second device may further determine the adjustment rate of the first QP by considering a priority of the virtual machine on the first device. During specific implementation, a QP in the first device may establish a binding relationship with a specified virtual machine. In this case, all packets of the virtual machine are sent to the second device by using the QP bound to the virtual machine. The network interface card of the second device determines the adjustment rate of the first QP based on the instant rate of the first QP, the maximum sending rate of the first QP, and the service priority of the virtual machine on the first device.

When determining the adjustment rate of the first QP, the network interface card of the second device may determine the adjustment rate of the first QP by simultaneously considering the priorities of the first device and the virtual machine on the first device. When adjusting the rate at which the first QP sends a packet, the network interface card determines the adjustment rate of the first QP not only by considering the instant rate of the first QP and the maximum sending rate of the first QP, but also by considering different service priorities of the first device and the virtual machine on the first device, thereby preferentially ensuring a processing process of a service having a high priority while relieving network congestion, and further improving reasonableness of congestion relief of the data transmission system.

In another possible implementation, the data transmission system further includes at least one third device, each of the at least one third device establishes at least one QP between the second device and each of the at least one third device based on the RoCE protocol, and the data transmission system includes m QPs; and the determining, by the network interface card of the second device, an adjustment rate of the first QP based on the instant rate of the first QP and the maximum sending rate of the first QP includes:

When adjusting the rate at which the first device sends a packet, the network interface card of the second device may obtain the adjustment rate $S_1$ of the first QP by using a formula $$S_1 = D \frac{A_1/C_1}{\sum_{i=1}^{m} A_i/C_i}$$

and based on the instant rate $A_1$ of the first QP, the maximum sending rate $C_1$ of the first QP, and a rate D during congestion of the switch, and the adjustment rate $S_1$ of the first QP is the adjustment rate at which the first device sends a packet, where $A_i$ indicates an instant rate of an $i^{th}$ QP of the m QPs, $C_i$ indicates a maximum sending rate of an $i^{th}$ QP in each QP, m is a positive integer, and i is a positive integer ranging from 1 to m.

A capability of forwarding a packet of the first QP by the switch during congestion of the switch can be determined by using the foregoing formula. In this way, the adjustment rate of the first QP is determined, and network congestion of the switch is relieved.

In another possible implementation, the data transmission system further includes at least one third device, each of the at least one third device establishes at least one QP between the second device and each of the at least one third device based on the RoCE protocol, and the data transmission system includes m QPs; and the determining, by the network interface card of the second device, the adjustment rate of the first QP based on the instant rate of the first QP, a priority of the first device, and the maximum sending rate of the first QP includes: when adjusting the rate at which the first device sends a packet, obtaining, by the network interface card of the second device, an adjustment basis by using a formula $$S_1 = DB_1 \frac{A_1/C_1}{\sum_{i=1}^{m} A_i/C_i}$$

and based on the instant rate $A_1$ of the first QP, a weight coefficient $B_1$ corresponding to the priority of the first device, the maximum sending rate $C_1$ of the first QP, and a rate D during congestion of the switch, where the obtained adjustment rate $S_1$ of the first QP is the adjustment basis of the rate at which the first device sends a packet, $A_i$ indicates an instant rate of an $i^{th}$ QP of the m QPs, C indicates a maximum sending rate of the $i^{th}$ QP of the m QPs, m is a positive integer, and i is a positive integer ranging from 1 to m.

In another possible implementation, before the obtaining, by the network interface card of the second device, an instant rate of the first QP, the packet sending method includes: when receiving the packet sent by the first device, reading, by the network interface card of the second device, a flag bit that is in the packet and that is used to indicate whether network congestion occurs on the switch; and when the flag bit indicates that network congestion occurs on the switch, performing the method according to any possible implementation of the first aspect, to adjust the rate at which the first device sends the packet.

An operating status of the data transmission system can be recognized rapidly by reading the flag bit that is in the packet and that indicates whether network congestion occurs on the switch, to adjust the rate at which the first device sends the packet in a timely manner.

According to a second aspect, a packet sending apparatus is configured to perform the method according to the first aspect or any possible implementation of the first aspect, and their technical effects are the same. Specifically, the apparatus includes modules configured to perform the method according to the first aspect or any possible implementation of the first aspect.

In a possible implementation, a packet is transmitted between the packet sending apparatus and a first device based on a RoCE protocol, the first device establishes a first queue pair QP, the packet sending apparatus establishes a first QP' associated with the first QP, and the packet sending apparatus includes an obtaining module, a processing module, and a sending module, where the obtaining module is configured to: receive a first packet that is from the first QP of the first device and that is forwarded by using a switch, and obtain an instant rate of the first QP and a maximum sending rate of the first QP, where the instant rate of the first QP represents a quantity of packets that are sent between the first QP and the first QP' within a unit time, and the maximum sending rate of the first QP represents a preset maximum quantity of packets that are allowed to be sent between the first QP and the first QP' within the unit time; the processing module is configured to determine an adjustment rate of the first QP based on the instant rate of the first QP and the maximum sending rate of the first QP; and the sending module is configured to send a congestion notification packet to the first device, where the congestion notification packet carries the adjustment rate of the first QP.

The apparatus may determine the adjustment rate by using an instant rate of a QP and a maximum rate of a QP. In this way, a network congestion problem of the switch can be relieved, and moreover, service processing duration can be reduced while ensuring service processing capabilities of the first device and a virtual machine running on the first device.

In another possible implementation, the processing module is further configured to determine the adjustment rate of the first QP based on the instant rate of the first QP, a weight coefficient corresponding to a priority of the first device, and the maximum sending rate of the first QP.

In another possible implementation, when determining the adjustment rate of the first QP, the processing module of the packet sending apparatus may further determine the adjustment rate of the first QP by considering a priority of the virtual machine on the first device. During specific implementation, a QP in the first device may establish a binding relationship with a specified virtual machine. In this case, all packets of the virtual machine are sent to a storage device by using the QP bound to the virtual machine. The processing module of the packet sending apparatus determines the adjustment rate of the first QP based on the instant rate of the first QP, the maximum sending rate of the first QP, and a service priority of a virtual machine in a first device.

In another possible implementation, when determining the adjustment rate of the first QP, the processing module of the packet sending apparatus may determine the adjustment rate of the first QP by simultaneously considering priorities of the first device and the virtual machine on the first device. When adjusting the rate at which the first QP sends a packet, the processing module of the packet sending apparatus determines the adjustment rate of the first QP not only by considering the instant rate of the first QP and the maximum sending rate of the first QP, but also by considering different service priorities of the first device and the virtual machine on the first device, thereby preferentially ensuring a processing process of a service having a high priority while relieving network congestion, and further improving reasonableness of congestion relief of a data transmission system.

In another possible implementation, each of at least one second device further establishes at least one QP between the packet sending apparatus and each of the at least one second device based on the RoCE protocol, and the first device and the second device include m QPs; and the processing module is configured to determine the adjustment rate $S_1$ of the first QP by using a formula $$S_1 = D \frac{A_1/C_1}{\sum_{i=1}^{m} A_i/C_i}$$

and based on the instant rate $A_1$ of the first QP, the maximum sending rate $C_1$ of the first QP, and a port rate D during congestion of the switch, where $A_i$ indicates an instant rate of an $i^{th}$ QP of the m QPs, $C_i$ indicates a maximum sending rate of the $i^{th}$ QP of the m QPs, m is a positive integer, and i is a positive integer ranging from 1 to m.

A capability of forwarding a packet of the first QP by the switch during congestion of the switch can be determined by using the foregoing formula. In this way, the adjustment rate of the first QP is determined, and network congestion of the switch is relieved.

In another possible implementation, each of at least one second device further establishes at least one QP between the packet sending apparatus and each of the at least one second device based on the RoCE protocol, and the first device and the second device includes m QPs; and the processing module is configured to: determine the adjustment rate $S_1$ of the first QP by using a formula $$S_1 = DB_1 \frac{A_1/C_1}{\sum_{i=1}^{m} A_i/C_i}$$

and based on the instant rate $A_1$ of the first QP, a weight coefficient $B_1$ corresponding to a priority of a first server, the maximum sending rate $C_1$ of the first QP, and a port rate D during congestion of the switch, where $A_i$ indicates an instant rate of an $i^{th}$ QP of the m QPs, $C_i$ indicates a maximum sending rate of the $i^{th}$ QP of the m QPs, m is a positive integer, and i is a positive integer ranging from 1 to m.

In another possible implementation, the obtaining module is configured to: receive the first packet that is from the first QP of the first device and that is forwarded by using the switch, read an ECN flag bit of the first packet, determine that the ECN flag bit of the first packet indicates that network congestion occurs on the switch, and obtain the instant rate of the first QP and the maximum sending rate of the first QP.

According to a third aspect, a storage device includes a processor, a memory, a communications interface, a network interface card, and a bus. The processor, the memory, the communications interface, and the network interface card are connected to each other and implement mutual communication by using the bus. The memory is configured to store a computer execution instruction. When a storage device runs, the processor executes the computer execution instruction in the memory, to perform the operation steps according to the first aspect or any possible implementation of the first aspect by using a hardware resource in the storage device.

According to a fourth aspect, a computer-readable storage medium stores an instruction. When run on a computer, the instruction causes the computer to execute an instruction of the method according to the first aspect or any possible implementation of the first aspect.

The implementations provided in the foregoing aspects may further be combined to provide more implementations.

DESCRIPTION OF EMBODIMENTS

The following describes the technical solutions with reference to the accompanying drawings.

Figure 1:
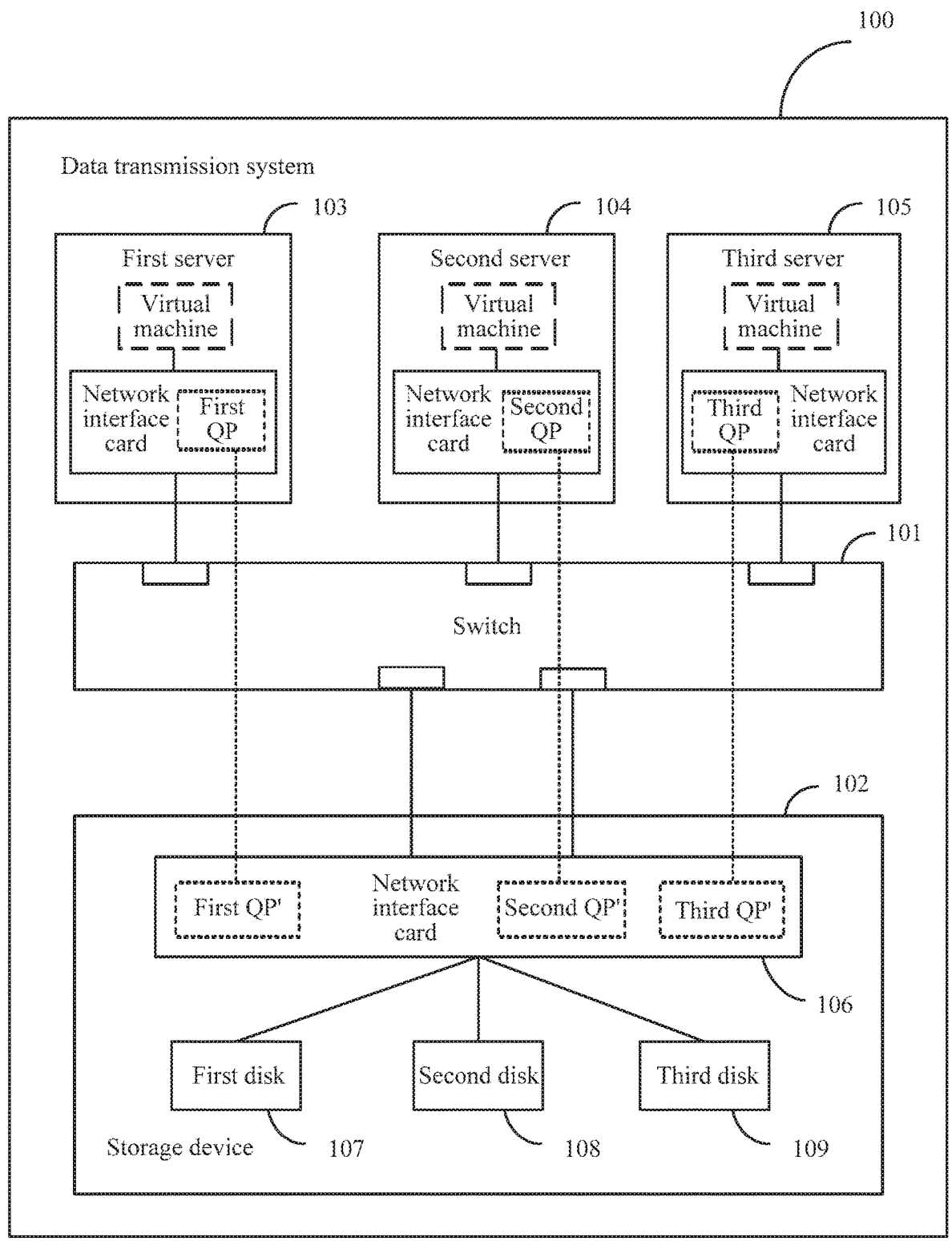
FIG. 1 is a schematic structural diagram of a data transmission system.

FIG. 1 is a schematic structural diagram of a data transmission system. As shown in FIG. 1, the data transmission system 100 may include at least a switch 101, a storage device 102, and at least one server, for example, a first server 103, a second server 104, and a third server 105. At least one virtual machine runs on each server, and each virtual machine represents one storage access user. Each server is provided with a network interface card. A read/write access request of the virtual machine to the storage device 102 is sent, in a packet form, by the network interface card of the server to the storage device 102 by using the switch 101.

In addition to the components shown in FIG. 1, the data transmission system 100 may further include another component such as a communications interface. This is not limited herein. In addition, the storage device may be one server or may be a set including a plurality of servers.

A plurality of virtual machines may run on each server in the storage system shown in FIG. 1. For ease of subsequent description, the following descriptions are given by using an example in which only one virtual machine runs on a server.

The storage device 102 may include a network interface card 106 and at least one disk, for example, a first disk 107, a second disk 108, and a third disk 109. Each disk may be an NVMe disk. The network interface card 106 is configured to: receive a packet that is sent by the virtual machine by using the switch 101, and distribute the received packet to each disk included in the storage device 102.

The switch 101 includes at least one receive port and at least one transmit port. The switch 101 receives, by using the receive port, packets sent by network interface cards of different servers, and sends the packets to the storage device 102 by using the transmit port. For example, a same server may access different disks by using the switch 101, and a same disk may be allocated to different servers for access, to share a storage resource in the storage device 102.

The switch includes one or more transmit ports. When network congestion occurs on any transmit port, processing capabilities of a server and a virtual machine running on the server are affected. As shown in FIG. 1, two transmit ports are shown in the figure.

An RDMA technology may be used for a read/write access request between the server and the storage device 102. The RDMA technology is a technology for directly performing remote memory access, and by using the RDMA technology, data may be directly copied from a memory of one device to a memory of another remote device rapidly, thereby reducing attenuation of central processing units (CPU) of a server and a storage device in participating in a data transmission process, and further, improving service processing performance of the system. The RDMA technology has features such as a high bandwidth, a low delay, and a low CPU occupation rate. In the data transmission system 100, the read/write access request between the server and the storage device 102 is transmitted in a packet form by using the switch 101, and specifically, may be transmitted by using a RoCE v1 protocol or a RoCE v2 protocol.

The server and the storage device 102 each are provided with an RDMA-enabled network interface card (RNIC), which is configured to implement RDMA connection-based data transmission. During RDMA connection-based data transmission between a server A and the storage device 102, an RNIC of the server A may directly read data from a memory of the server A, and sends the read data to an RNIC of a storage device B. The RNIC of the storage device B writes the data received from the RNIC of the device A into a memory of the storage device B.

Specifically, when a packet is transmitted between a server and the storage device 102 based on the RoCE protocol, the network interface card of the server and the network interface card 106 of the storage device 102 each pre-establish a QP, and each QP includes a receive queue (RQ) and a send queue (SQ). Then, QPs of the server and the storage device 102 establish a binding relationship, in other words, an SQ in a QP is associated with an RQ in a peer QP, and an RQ in the QP is associated with an SQ in the peer QP, thereby associating the QP with the peer QP, and implementing an RDMA connection. A plurality of virtual machines may run on a same server, and one network interface card may establish a plurality of QPs. In specific application, a virtual machine may be associated with a specified QP based on a service requirement. In this case, all read/write requests sent by the virtual machine are sent to the storage device by using the QP associated with the virtual machine. During specific implementation, the virtual machine may be associated with at least one specified QP based on the service requirement, but one QP can be associated with only one virtual machine. For ease of subsequent description, the following descriptions are given merely by using an example in which each virtual machine corresponds to one QP.

For example, the network interface card 106 of the storage device 102 establishes a first QP', a network interface card of the first server 103 establishes a first QP, an SQ in the first QP is associated with an RQ in the first QP', and an RQ in the first QP is associated with an SQ in the first QP'. The first QP and the first QP' are referred to as peer QPs of each other. The network interface card 106 of the storage device 102 further establishes a second QP', a network interface card of the second server 104 establishes a second QP, an SQ in the second QP is associated with an RQ in the second QP', and an RQ in the second QP is associated with an SQ in the second QP'. The second QP and the second QP' are referred to as peer QPs of each other. The network interface card 106 of the storage device 102 further establishes a third QP', a network interface card of the third server 105 establishes a third QP, an SQ in the third QP is associated with an RQ in the third QP', and an RQ in the third QP is associated with an SQ in the third QP'. The third QP and the third QP' are referred to as peer QPs of each other. Optionally, the data transmission system 100 may further include a server not provided with a QP.

A packet sent by the first server 103 to the storage device 102 based on a QP carries an identifier of the first QP'. Correspondingly, a packet sent by the storage device 102 to the first server 103 based on a QP carries an identifier of the first QP. That is, when a transmit end sends a packet to a receive end, an identifier of a QP of the receive end is added to the packet. Therefore, when the network interface card 106 of the storage device 102 simultaneously receives packets from a plurality of QPs, the network interface card 106 stores, based on identifiers of the QPs in the packets, the packets in RQs indicated by the identifiers of the QPs. For example, the first server 103 sends a first packet to the network interface card 106, and the first packet carries the identifier of the first QP' in the network interface card 106. When receiving the first packet, the network interface card 106 may determine, based on the identifier of the first QP' carried in the first packet, that the first packet is a packet belonging to the first QP', and therefore, store the first packet in an RQ of the first QP'.

The switch 101 may simultaneously receive packets sent by a plurality of servers in the data transmission system 100. For example, the first server 103 sends a packet to the switch 101 at a rate $V_1$, the second server 104 sends a packet to the switch 101 at a rate $V_2$, and the third server 105 sends a packet to the switch 101 at a rate $V_3$. In this case, the switch 101 needs to forward these packets to the storage device 102 through one or more ports. When the switch detects that wait duration of a packet in a send queue of any port connected to the storage device 102 exceeds preset duration, the switch 101 determines that the port is congested. In this case, the congested port of the switch 101 affects service processing efficiency of the storage device 102, thereby prolonging service processing duration.

To avoid congestion, in a conventional data transmission system 100, a network interface card in each server may control port congestion based on a QP. Specifically, when determining that the port is congested, the switch 101 changes an ECN flag bit of a packet in a to-be-sent queue, so that a changed ECN flag bit indicates that congestion occurs on the switch. When an ECN flag bit in a packet received by the storage device 102 indicates congestion, the storage device 102 feeds back a CNP to each server sending the packet. In this case, each server reduces a sending rate of a packet based on a preset ratio, thereby controlling data transmission of the data transmission system and avoiding packet congestion. For example, when the preset ratio is 20%, the first server 103 sends a packet to the switch 101 at a rate 80% of $V_1$, the second server 104 sends a packet to the switch 101 at a rate 80% of $V_2$, and the third server 105 sends a packet to the switch 101 at a rate 80% of $V_3$. That is, a sending rate of each server is reduced by 20%. However, each server has a different maximum sending rate. For example, when the first server 103 sends a packet to the switch 101 at the rate $V_1$, only 50% of a service processing capability of a virtual machine on the first server 103 is occupied; and when the second server 104 sends a packet to the switch 101 at the rate $V_2$, 90% of a service processing capability of a virtual machine on the second server 104 is occupied. If sending rates of both the first server 103 and the second server 104 are reduced by 20% in this case, service processing duration of the first server 103 is severely prolonged, and service processing capabilities of the first server 103 and the virtual machine running on the first server 103 are affected. A conventional congestion control method has not resolved the network congestion problem in the data transmission system 100 fundamentally.

To resolve the foregoing problem, this disclosure provides a packet sending method and apparatus, and a storage device. The packet sending method and apparatus, and the storage device are described in detail with reference to specific embodiments. In the following several embodiments, details of a same or similar concept or process may not be described again in some embodiments.

Figure 2:
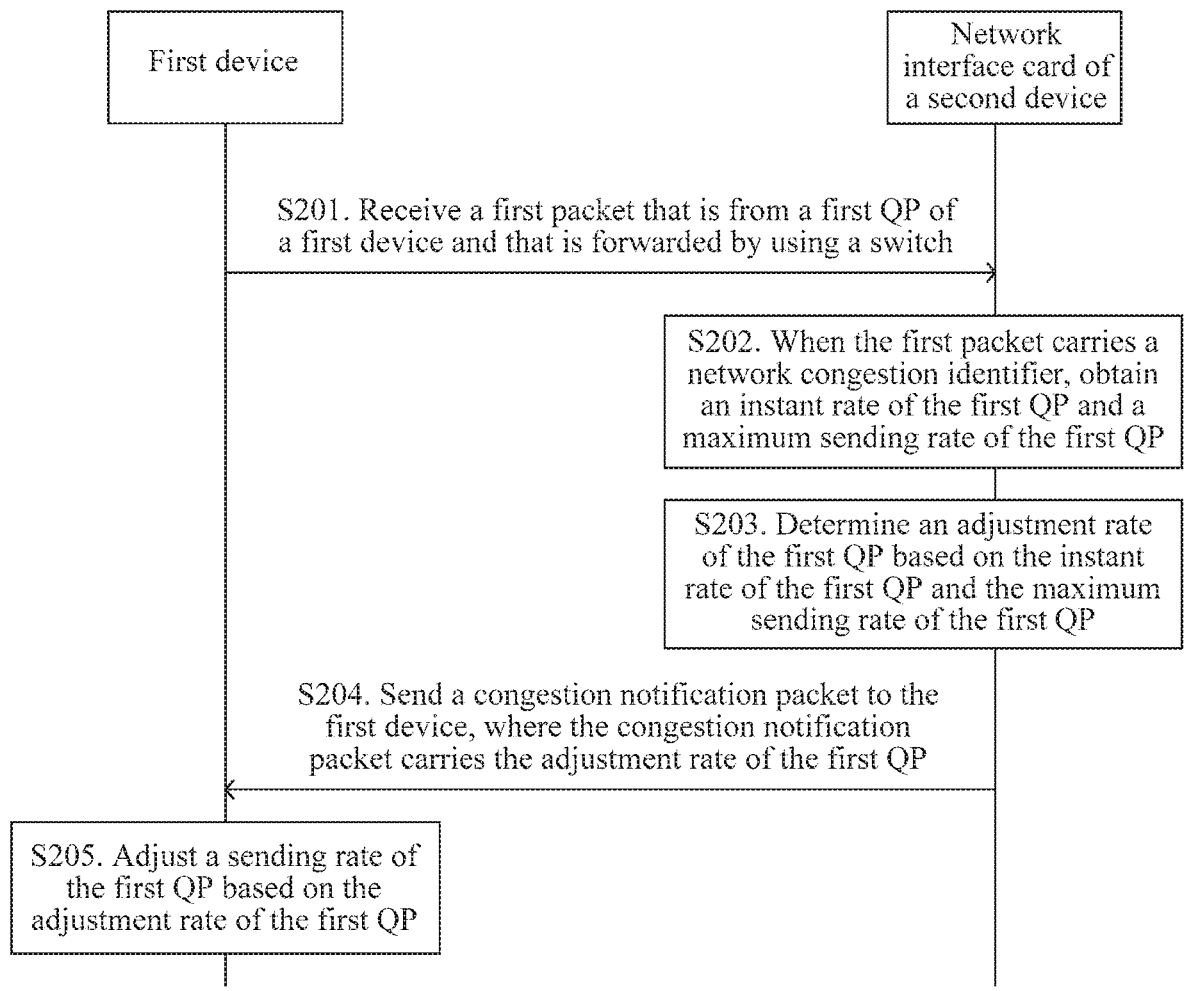
FIG. 2 is a schematic flowchart of a packet sending method.

FIG. 2 is a schematic flowchart of a packet sending method. In this embodiment, a network interface card of a storage device determines, based on an instant rate at which a QP sends a packet and a maximum sending rate of the QP, an adjustment rate at which each QP sends a packet, thereby relieving congestion of a data transmission system while ensuring service processing capabilities of each server and a virtual machine running on each server.

As shown in FIG. 1, a plurality of QPs exist in the data transmission system. The following embodiments use a first QP as an example, to describe a step of determining, by the network interface card of the storage device, an adjustment rate of the first QP. A step of determining an adjustment rate of another QP in the data transmission system is the same as the step of determining, by the network interface card, the adjustment rate of the first QP, and details are not described herein again.

The packet sending method provided in this embodiment is applied to the data transmission system 100 shown in FIG. 1, a first device may be the first server 103 in FIG. 1, and the second device may be the network interface card 106 in FIG. 1. As shown in FIG. 2, the packet sending method includes the following steps:

S201. A network interface card of the second device receives a first packet that is from the first QP of the first device and that is forwarded by using a switch.

The network interface card 106 of a storage device 102 receives, based on a QP, the packet forwarded by the switch 101. The packet carries an identifier of the QP. The network interface card 106 may determine, based on the identifier of the QP, a QP to which the packet belongs, and further distinguish, based on a server in which the QP is located, the server sending the packet. In this embodiment, an example in which the packet received by the network interface card 106 is the first packet sent by the first QP is used.

S202. When the first packet carries a network congestion identifier, the network interface card of the second device obtains an instant rate of the first QP and a maximum sending rate of the first QP.

After receiving the first packet, the network interface card 106 determines whether the first packet carries the network congestion identifier; and if the first packet carries the network congestion identifier, considers that a port of the switch 101 is congested; or if the first packet does not carry the network congestion identifier, considers that a port of the switch 101 is not congested. For example, a specific manner in which the first packet carries the network congestion identifier may be setting an ECN flag bit in the first packet. The ECN flag bit is used to indicate whether the port of the switch 101 is congested. After receiving the first packet, the network interface card 106 reads the ECN flag bit of the first packet, and determines, based on the ECN flag bit of the first packet, whether network congestion occurs on the port of the switch 101.

When the ECN flag bit performs identification by using a plurality of bits, the ECN flag bit may further be used to indicate a congestion degree of the port of the switch 101. The ECN flag bit may be the last two bits of a type of service (TOS) field in an IP header. When the switch 101 detects that wait duration of a packet in a send queue of any port connected to the storage device 102 exceeds preset duration, the switch 101 determines that the port is congested. In this case, the switch adds a network congestion identifier to the packet. Specifically, the switch 101 changes a value of the ECN flag bit in the packet, for example, changes the value of the ECN flag bit from 10 into 11. When reading, from an IP packet of the packet, that the value of the ECN flag bit is 11, the network interface card of the storage device may determine that the port of the switch 101 is congested. Optionally, the switch 101 may further set different values for ECN flag bits, and different values may be used to indicate congestion degrees of the port of the switch 101.

The instant rate of the first QP is a quantity of packets that are sent between the first QP and a first QP' within a unit time. The maximum sending rate of the first QP is a preset maximum quantity of packets that are allowed to be sent between the first QP and the first QP' within the unit time.

Further, the network interface card 106 may obtain the instant rate of the first QP in any one of the following manners:

In a first manner, when the network interface card 106 determines, based on the first packet, that the port of the switch 101 is congested, the network interface card 106 counts a quantity of packets that belong to the first QP' and that are received within a unit time, to determine an instant rate at which the network interface card 106 receives a packet sent by the first server 103, to serve as the instant rate of the first QP.

In a second manner, when sending a packet to the network interface card 106, the first server 103 periodically sends a rate notification packet to the network interface card 106, and the rate notification packet carries the instant rate at which the first QP sends the packet.

The network interface card 106 of the storage device may determine the maximum sending rate of the first QP in the following manner: obtaining, by the network interface card 106, the maximum sending rate of the first QP based on a type of service corresponding to the first QP.

Specifically, maximum sending rates corresponding to a QP are different due to different types of service processed by the QP. When the first QP is established between the first server 103 and the storage device 102, a mapping table between a type of service and a maximum sending rate may be pre-stored in the storage device 102. When the first packet is received, the maximum sending rate of the first QP may be determined based on a type of service processed by the first QP.

An adjustment rate of the first QP is inversely proportional to the maximum sending rate of the first QP, in other words, a larger maximum sending rate of the first QP indicates a smaller adjustment rate of the first QP, so that after the network interface card of the first server 103 performs congestion adjustment based on the adjustment rate of the first QP, a decline of a rate at which the first server 103 sends a packet belonging to the first QP is relatively small. A smaller maximum sending rate of the first QP indicates a larger adjustment rate of the first QP, so that after the network interface card of the first server 103 performs congestion adjustment based on the adjustment rate of the first QP, the decline of the rate at which the first server 103 sends the packet belonging to the first QP is relatively large.

In a data transmission system, when a server and a virtual machine on the server provide different types of service, because different types of service have different service-level agreements (SLA), different servers and virtual machines have different maximum sending rates when sending a packet to a storage device. For example, a relatively large maximum sending rate may be allocated to a server processing a delay-sensitive service, and a relatively small maximum sending rate is allocated to a server processing a delay-insensitive service. The maximum sending rate of the first QP indicates the maximum sending rate at which the first server sends a packet to the storage device in the first QP.

An adjustment rate of each QP is determined by using a maximum sending rate corresponding to each QP, so that a decline of a rate at which a server having a relatively large maximum sending rate sends a packet during congestion of the data transmission system is relatively small, thereby ensuring performance of the server processing the delay-sensitive service, and relieving congestion of the data transmission system while ensuring service processing capabilities of each server and a virtual machine running on each server.

In a possible implementation, in addition to adjusting a sending rate of a QP by adding a congestion notification identifier to a packet, the network interface card 106 may adjust the sending rate of the QP based on the foregoing method when receiving all packets. That is, after receiving a packet, an instant rate and a maximum sending rate of a QP corresponding to the packet are obtained. Then, an adjustment rate of the QP is determined based on the instant rate and the maximum sending rate.

S203. The network interface card of the second device determines the adjustment rate of the first QP based on the instant rate of the first QP and the maximum sending rate of the first QP.

The adjustment rate of the first QP is a ratio at which a transmit port of the switch forwards a packet belonging to the first QP when network congestion occurs on the switch.

In a possible implementation, the data transmission system further includes at least one third device. As shown in FIG. 1, the third device may be a second server 104 or a third server 105. One or more QPs may be established between the server and the storage device, and the data transmission system includes a plurality of QPs. Each of the at least one third device establishes an $i^{th}$ QP between the second device and each of the at least one third device based on a RoCE protocol, and the data transmission system includes m QPs. For example, as shown in FIG. 1, the data transmission system 100 further includes the second server 104 and the third server 105. The second server 104 establishes a second QP between the storage device 102 and the second server 104 based on the RoCE protocol. The storage device 102 establishes a second QP'. The third server 105 establishes a third QP between the storage device 102 and the third server 105 based on the RoCE protocol. The storage device 102 establishes a third QP'. In this case, the determining, by the network interface card, the adjustment rate of the first QP based on the instant rate of the first QP and the maximum sending rate of the first QP specifically includes: determining, by the network interface card, the adjustment rate $S_1$ of the first QP by using a formula $$S_1 = D \frac{A_1/C_1}{\sum_{i=1}^{m} A_i/C_i}$$

and based on the instant rate $A_1$ of the first QP, the maximum sending rate $C_1$ of the first QP, and a rate D during congestion of the switch, where $A_i$ indicates an instant rate of the $i^{th}$ QP, $C_i$ indicates a maximum sending rate of the $i^{th}$ QP, m is a positive integer, and i is a positive integer ranging from 1 to m.

In addition, a method for determining the rate D during congestion of the switch may be any one of the following cases:

In a first case, when the switch includes only one transmit port, the rate D during congestion of the switch is a rate of the transmit port during congestion of the switch, that is, a quantity of packets that are sent by the transmit port to the storage device within a unit time during congestion of the switch.

In a second case, when the switch includes two or more transmit ports, the rate D during congestion of the switch is an average value of rates of all the transmit ports during congestion of the switch. A rate of each transmit port is a quantity of packets that are sent by the port to the storage device within the unit time during congestion of the switch.

The network interface card 106 of the storage device 102 may determine, based on an identifier that is of a QP and that is carried in a packet received within the unit time, a QP to which the packet received by the network interface card 106 belongs, count a total quantity of QPs, and record the total quantity as m. In other words, the m QPs in the network interface card 106 each have received a packet. To distinguish the QPs, the QPs are numbered as the $i^{th}$ QP, and i is a positive integer ranging from 1 to m. Correspondingly, the instant rate of the $i^{th}$ QP is recorded as $A_i$, and the maximum sending rate corresponding to the $i^{th}$ QP is recorded as $C_i$.

$$\frac{A_i}{C_i}$$

is a ratio of the instant rate to the maximum sending rate at which the $i^{th}$ QP receives a packet, or may be considered as a ratio of an instant rate to a maximum sending rate at which an $i^{th}$ server corresponding to the $i^{th}$ QP sends a packet. If the ratio $$\frac{A_i}{C_i}$$

is 1, it indicates that the instant rate at which the $i^{th}$ server sends the packet reaches the maximum sending rate of the $i^{th}$ server. If the ratio $$\frac{A_i}{C_i}$$

is less than 1, it indicates that the instant rate at which the $i^{th}$ server sends the packet is less than the maximum sending rate of the $i^{th}$ server, where a smaller instant rate of the $i^{th}$ server indicates a smaller maximum sending rate of the $i^{th}$ server. If the ratio $$\frac{A_i}{C_i}$$

is greater than 1, it indicates that the instant rate at which the $i^{th}$ server sends the packet exceeds the maximum sending rate of the $i^{th}$ server, where a larger instant rate of the $i^{th}$ server indicates a larger maximum sending rate of the $i^{th}$ server. For example, if an instant rate at which the first server sends a packet is 600 megabits per second (Mbps), and a maximum sending rate is 2 gigabits per second (Gbps), the value of $$\frac{A_1}{C_1}$$

is 0.3. In this case, the instant rate of the first server is much less than the maximum sending rate of the first server.

$$\sum_{i=1}^{m} \frac{A_i}{C_i}$$

is a sum of ratios of instant rates to maximum sending rates of all QPs received by the storage device 102, and $$\frac{A_1/C_1}{\sum_{i=1}^{m} A_i/C_i}$$

is used to indicate a proportion of a ratio of the first QP in the ratios of all the QPs. A larger proportion indicates a larger degree by which the first QP of all the QPs exceeds the maximum sending rate. Therefore, it may be determined by using Formula 1 for calculating $S_1$ that a larger proportion indicates a larger adjustment rate corresponding to a QP exceeding the maximum sending rate. In the packet sending method, the adjustment rate is determined based on service processing capability requirements of different servers, thereby fundamentally relieving congestion of the data transmission system.

For example, as shown in FIG. 1, the data transmission system includes three servers, and each server establishes a group of QPs with the storage device. For example, the first server 103, the second server 104, and the third server 105 send packets to the storage device 102 respectively by using the first QP, the second QP, and the third QP, a ratio $$\frac{A_1}{C_1}$$

of the first QP is 1.1, a ratio $$\frac{A_2}{C_2}$$

of the second QP is 0.2, and a ratio $$\frac{A_3}{C_3}$$

of the third QP is 0.5, it may be determined, based on the formula for calculating $S_1$, that $$\sum_{i=1}^{m} \frac{A_j}{C_j}$$

is 1.8. Correspondingly, the adjustment rate $S_1$ corresponding to the first QP is 0.61. In addition, it may be obtained that an adjustment rate $S_2$ corresponding to the second QP is 0.11, and the adjustment rate S3 corresponding to the third QP is 0.28. Therefore, when the first server 103, the second server 104, and the third server 105 adjust sending rates of packets based on respective corresponding adjustment rates, a decline of the sending rate of the first server 103 is the largest, and a decline of the sending rate of the second server 104 is the smallest, so that different adjustment rates are determined for different servers and virtual machines on the servers.

In a possible implementation, the network interface card of the storage device may alternatively determine the adjustment rate $S_1$ of the first QP by using a formula $$S_1 = D \frac{A_1}{C_1}$$

(Formula 2).

$\frac{A_1}{C_1}$ is a ratio of the instant rate $A_1$ to the maximum sending rate $C_1$ at which the first QP receives a packet, or may be considered as a ratio of the instant rate to the maximum sending rate at which the first server corresponding to the first QP sends a packet; and D is a rate during congestion of the switch. Compared with Formula 1, the storage device 102 in Formula 2 determines the adjustment rate of the first QP based on the instant rate and the maximum sending rate of the first QP, without considering that the network interface card 106 also receives a packet belonging to another QP; and does not consider an instant rate and a maximum rate of the another QP when obtaining the adjustment rate of the first QP. In this implementation, the method for obtaining the adjustment rate of the first QP is simple and rapid.

S204. The network interface card of the second device sends a congestion notification packet to the first device, where the congestion notification packet carries the adjustment rate of the first QP.

After determining the adjustment rate of the first QP, the network interface card 106 adds the adjustment rate of the first QP to a CNP, and sends the CNP to the first server 103 corresponding to the first QP.

S205. The first device adjusts a sending rate of the first QP based on the adjustment rate of the first QP.

Specifically, after receiving the CNP, the first server reduces the sending rate of the first QP of the first server 103 based on the adjustment rate of the first QP, thereby relieving a congestion status of the port of the switch.

In a possible implementation, an SQ of the first QP of the first server 103 is provided with a congestion control table (CCT). The CCT stores sending rates of different packets. The CCT may further store different inter-packet delays (IPDs). A sending rate of a packet in the SQ of the first QP depends on a CCT pointer corresponding to the SQ. The CCT pointer points to the sending rate in the CCT. When the first server 103 receives the CNP, the SQ of the first QP adjusts, based on the adjustment rate of the first QP, a value of the CCT pointer corresponding to the SQ of the first QP, to obtain a new sending rate of the SQ of the first QP. Optionally, when the first server 103 has not received the CNP within a period of time, the first server 103 slowly adjusts the value of the CCT pointer, so that the sending rate of the packet in the SQ of the first QP gradually increases until reaching a maximum sending rate of the SQ of the first QP.

According to the packet sending method provided in this embodiment, an adjustment rate at which a server sends a packet is determined based on an instant rate at which the server sends the packet and a corresponding maximum sending rate at which the server sends the packet, thereby relieving congestion of the data transmission system while ensuring service processing capabilities of each server and a virtual machine running on each server.

Figure 3:
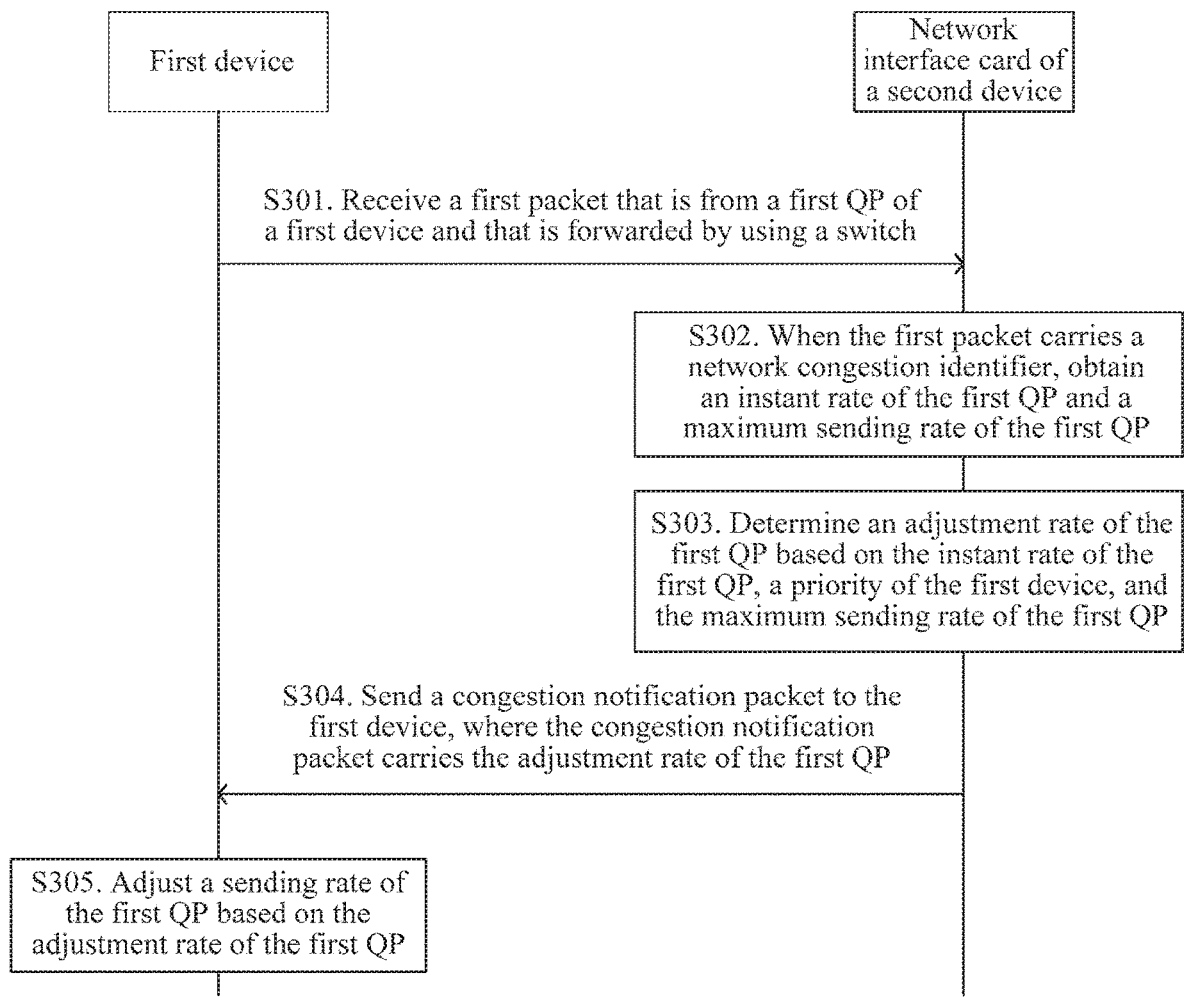
FIG. 3 is a schematic flowchart of another packet sending method.

FIG. 3 is a schematic flowchart of another packet sending method. In this embodiment, a network interface card may further determine an adjustment rate of a first QP based on different service priorities of servers and virtual machines on the servers, thereby further improving reasonableness of congestion relief of the data transmission system in the packet sending method. As shown in FIG. 3, the packet sending method includes the following steps:

S301. A network interface card of a second device receives a first packet that is from a first QP of a first device and that is forwarded by using a switch.

S302. When the first packet carries a network congestion identifier, the network interface card of the second device obtains an instant rate of the first QP and a maximum sending rate of the first QP.

Specifically, S301 and S302 in this embodiment are the same as S201 and S202 in the embodiment shown in FIG. 2, and details are not described again.

S303. The network interface card of the second device may further determine an adjustment rate of the first QP based on the instant rate of the first QP, a priority of the first device, and the maximum sending rate of the first QP.

S303 in this embodiment is similar to S203 in the embodiment shown in FIG. 2, and a difference is that in this embodiment, when the adjustment rate of the first QP is determined, a priority of a server, on which the network interface card is located is further considered, where the first QP is located on the network interface card. Specifically, when network congestion occurs on a data transmission system, services of a server having a relatively high priority and a virtual machine having a relatively high priority on the server need to be ensured preferentially. Therefore, in this embodiment, the adjustment rate of the first QP is determined based on the instant rate of the first QP, a priority of a first server, and the maximum sending rate of the first QP. When the priority of the first server is relatively high, the adjustment rate of the first QP is relatively small. When the priority of the first server is relatively low, the adjustment rate of the first QP is relatively large. Therefore, when the data transmission system is congested, a service processing capability of a server performing a service having a relatively high priority can be ensured while congestion of the data transmission system is relieved.

The data transmission system 100 further includes at least one third device. The third device may be the second server 104 or the third server 105 shown in FIG. 1. A storage device establishes at least one QP' between the storage device and the at least one third device based on a RoCE protocol. The data transmission system includes m QPs. Each of the at least one third device establishes at least one QP. For example, as shown in FIG. 1, the data transmission system 100 further includes the second server 104 and the third server 105. A storage device 102 establishes a second QP' between the storage device 102 and the second server 104 based on the RoCE protocol. The second server 104 establishes a second QP. The storage device 102 establishes a third QP' between the storage device 102 and the third server 105 based on the RoCE protocol. The third server 105 establishes a third QP. In this case, the determining, by the network interface card, the adjustment rate of the first QP based on the instant rate of the first QP, a priority of the first server, and the maximum sending rate of the first QP includes: determining, by the network interface card, the adjustment rate $S_1$ of the first QP by using a formula $$S_1 = DB_1 \frac{A_1/C_1}{\sum_{i=1}^{m} A_i/C_i}$$

(Formula 3) and based on the instant rate $A_1$ of the first QP, a weight coefficient $B_1$ corresponding to the priority of the first server, the maximum sending rate $C_1$ of the first QP, and a rate D during congestion of the switch, where $A_i$ indicates an instant rate of an $i^{th}$ QP of m QPs, $C_i$ indicates a maximum sending rate of the $i^{th}$QP of the m QPs, m is a positive integer, and i is a positive integer ranging from 1 to m.

For example, a higher priority of the server indicates a larger corresponding weight coefficient. For example, in FIG. 1, if the priority of the first server 103 is the highest, a priority of the second server 104 is medium, and a priority of the third server 105 is the lowest, a weight coefficient corresponding to the priority of the first server 103 may be, for example, 0.6, a weight coefficient corresponding to the priority of the second server 104 may be, for example, 0.3, and a weight coefficient corresponding to the priority of the third server 105 may be, for example, 0.1. Therefore, an adjustment rate of a QP in a server having a high priority is relatively small, thereby ensuring service processing efficiency of a server performing a service having a high priority and a virtual machine on the server.

In another possible implementation, the network interface card may alternatively determine the adjustment rate of the first QP based on the instant rate of the first QP, the maximum sending rate of the first QP and the priority of the virtual machine on the server.

Specifically, a QP in the first server may establish a binding relationship with a specified virtual machine. In this case, all packets of the virtual machine are sent to a storage device by using the QP bound to the virtual machine. A network interface card of the storage device determines the adjustment rate of the first QP based on the instant rate of the first QP, the maximum sending rate of the first QP, and a service priority of a virtual machine on the first server. For example, if a processing capability of the switch during congestion is 100 M/S, in this case, packets of a virtual machine 1 and a virtual machine 2 on a server 1 need to be processed. A priority of the virtual machine 1 is higher than that of the virtual machine 2, the virtual machine 1 is bound to a QP 1, and the virtual machine 2 is bound to a QP 2. Therefore, the switch preferentially ensures that a packet of the QP 1 is sent to the storage device. Correspondingly, when the adjustment rate of the first QP is determined, in Formula 3 in the foregoing embodiment, D is a weight corresponding to a priority of a virtual machine.

In another possible implementation, the network interface card may alternatively determine the adjustment rate of the first QP based on the instant rate of the first QP, the maximum sending rate of the first QP, the priority of the server, and the priority of the virtual machine.

Specifically, during specific implementation, there are a plurality of virtual machines running on a same server, and a different priority may be set for each virtual machine based on a service requirement. When determining the adjustment rate of the first QP, the network interface card 106 of the storage device may simultaneously consider priorities of a virtual machine and a server on which the virtual machine runs, and preset weights corresponding to different priorities. Correspondingly, in Formula 3 in the foregoing embodiment, D is a product of a weight corresponding to a priority of a virtual machine associated with the first QP and a weight corresponding to a priority of a server on which the virtual machine associated with the first QP is located.

By using the foregoing method, the adjustment rate of the first QP may further be determined with reference to SLAs of different servers and/or virtual machines, and a packet sending rate of a QP associated with a virtual machine having a high priority is preferentially ensured, thereby improving a service processing capability of the entire system, reducing a service processing delay, and improving processing efficiency of the system.

S304. The network interface card of the second device sends a congestion notification packet to the first device, where the congestion notification packet carries the adjustment rate of the first QP.

S305. The first device adjusts a sending rate of the first QP based on the adjustment rate of the first QP.

S304 and S305 in this embodiment are the same as S204 and S205 in the embodiment shown in FIG. 2, and details are not described again.

In this embodiment, when determining the adjustment rate of the first QP, the network interface card not only considers the maximum sending rate of the first QP, but also considers different service priorities of servers and virtual machines on the servers, thereby further improving reasonableness of congestion relief of the data transmission system in the packet sending method.

Optionally, the packet sending method provided in the embodiments in FIG. 1 to FIG. 3 may further be used for packet transmission between storage devices.

The packet sending method provided is described in detail above with reference to FIG. 1 to FIG. 3. A packet sending apparatus and device provided are described below with reference to FIG. 4 and FIG. 5.

Figure 4:
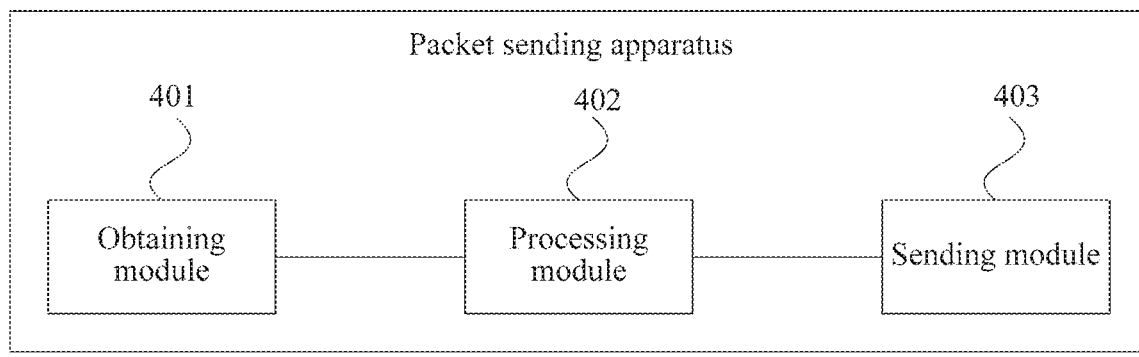
FIG. 4 is a schematic structural diagram of a packet sending apparatus.

FIG. 4 is a schematic structural diagram of a packet sending apparatus. As shown in the figure, the apparatus may be the storage device 102 or the network interface card 106 in the storage device 102 in the embodiment shown in FIG. 1. The storage device 102 establishes a first QP' between the apparatus and a first server 103 based on a RoCE protocol, the storage device 102 establishes a second QP' between the apparatus and a second server 104, the storage device 102 establishes a third QP' between the apparatus and a third server 103, the first server 103 establishes a first QP, the second server 104 establishes a second QP, and the third server 105 establishes a third QP, to implement the packet sending method in the embodiments shown in FIG. 2 and FIG. 3. In this embodiment, a first device may be the first server 103 in FIG. 1. As shown in FIG. 4, the packet sending apparatus includes an obtaining module 401, a processing module 402, and a sending module 403.

The obtaining module 401 is configured to: receive a first packet that is from a first QP of the first device and that is forwarded by using a switch, and obtain an instant rate of the first QP and a maximum sending rate of the first QP, where the instant rate of the first QP represents a quantity of packets that are sent between the first QP and a first QP' within a unit time, and the maximum sending rate of the first QP represents a preset maximum quantity of packets that are allowed to be sent between the first QP and the first QP' within the unit time.

The processing module 402 is configured to determine an adjustment rate of the first QP based on the instant rate of the first QP and the maximum sending rate of the first QP.

The sending module 403 is configured to send a congestion notification packet to the first device, where the congestion notification packet carries the adjustment rate of the first QP.

Optionally, the processing module 402 is further configured to determine the adjustment rate of the first QP based on the instant rate of the first QP, a weight coefficient corresponding to a priority of the first device, and the maximum sending rate of the first QP; or determine the adjustment rate of the first QP based on the instant rate of the first QP, the maximum sending rate of the first QP, and a weight coefficient corresponding to a priority of a virtual machine bound to the first QP; or determine the adjustment rate of the first QP based on the instant rate of the first QP, the maximum sending rate of the first QP, a priority of the first device, and a weight coefficient corresponding to a priority of a virtual machine bound to the first QP.

Optionally, each of at least one third device further establishes at least one QP between the packet sending apparatus and each of the at least one third device based on the RoCE protocol, and the first device and the at least one third device include m QPs; and the processing module 402 is configured to determine the adjustment rate $S_1$ of the first QP by using a formula $$S_1 = D \frac{A_1/C_1}{\sum_{i=1}^{m} A_i/C_i}$$

and based on the instant rate $A_1$ of the first QP, the maximum sending rate $C_1$ of the first QP, and a port rate D during congestion of the switch, where $A_i$ indicates an instant rate of an $i^{th}$ QP of the m QPs, $C_i$ indicates a maximum sending rate of the $i^{th}$ QP of the m QPs, m is a positive integer, and i is a positive integer ranging from 1 to m; and the third device may be the second server 104 or the third server 105 in the embodiment shown in FIG. 1.

Optionally, each of at least one third device further establishes at least one QP between the packet sending apparatus and each of the at least one third device based on the RoCE protocol, and the first device and the third device include m QPs; and the processing module 402 is configured to determine the adjustment rate $S_1$ of the first QP by using a formula $$S_1 = DB_1 \frac{A_1/C_1}{\sum_{i=1}^{m} A_i/C_i}$$

and based on the instant rate $A_1$ of the first QP, the weight coefficient $B_1$ corresponding to the priority of the first server, the maximum sending rate $C_1$ of the first QP, and a port rate D during congestion of the switch, where $A_i$ indicates an instant rate of an $i^{th}$ QP of the m QPs, $C_i$ indicates a maximum sending rate of the $i^{th}$ QP of the m QPs, m is a positive integer and i is a positive integer ranging from 1 to m; and the third device may be the second server 104 or the third server 105 in the embodiment shown in FIG. 1.

Optionally, the obtaining module 401 is configured to: receive the first packet that is from the first QP of the first device and that is forwarded by using the switch, read an ECN flag bit of the first packet, determine that the ECN flag bit of the first packet indicates that network congestion occurs on the switch, and obtain the instant rate of the first QP and the maximum sending rate of the first QP.

The apparatus may be implemented by using an application-specific integrated circuit (ASIC), or may be implemented by using a programmable logic device (PLD). The PLD may be a complex PLD (CPLD), a field-programmable gate array (FPGA), generic array logic (GAL), or any combination thereof. The method for implementing data processing shown in FIG. 2 and FIG. 3 may be implemented by using software, and the foregoing apparatus and various modules of the apparatus may be software modules.

The apparatus may be correspondingly configured to perform the described method. In addition, the foregoing operations and/or functions and other operations and/or functions of the units in the apparatus are respectively for the purpose of implementing corresponding procedures of the methods in FIG. 2 and FIG. 3. For brevity, details are not described herein.

According to the packet sending apparatus provided in this embodiment, an adjustment rate at which a server sends a packet is determined based on an instant rate at which the server sends the packet and a corresponding maximum sending rate at which the server sends the packet, and a sending rate of each QP is adjusted based on a different status of the QP, thereby relieving congestion of the data transmission system, and avoiding affecting service processing capabilities of the virtual machine and the server. Further, when determining the adjustment rate, the network interface card considers priorities of the virtual machine and/or the server. Different rate reducing policies are used for users having different priorities. A packet of a QP corresponding to a service requirement having a high priority is preferentially processed.

Figure 5:
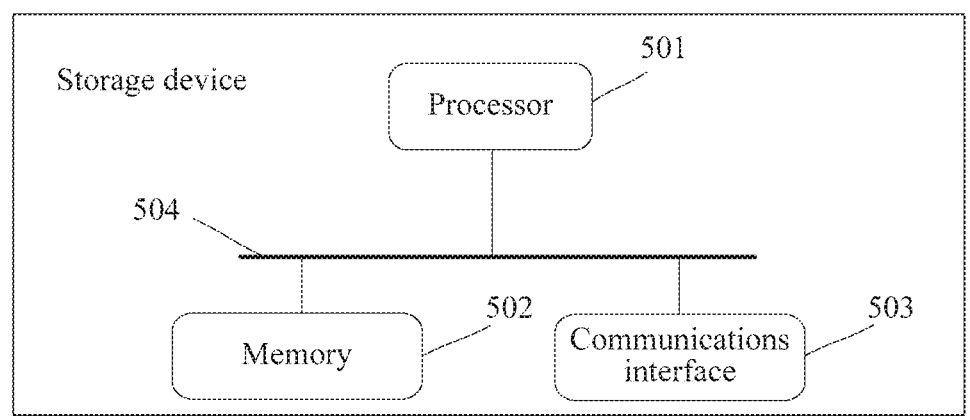
FIG. 5 is a schematic structural diagram of a storage device.

FIG. 5 is a schematic structural diagram of a storage device. As shown in FIG. 5, the storage device includes a processor 501, a memory 502, a communications interface 503, and a bus 504. The processor 501, the memory 502, and the communications interface 503 are connected to each other and implement mutual communication by using the bus 504, or communication may be implemented in other means such as wireless transmission. The memory 502 is configured to store a computer execution instruction. When the storage device runs, the processor 501 executes the computer execution instruction in the memory 502, to perform the following operations by using a hardware resource in the storage device: receiving a first packet that is from a first QP of a first device and that is forwarded by using a switch, and obtaining an instant rate of the first QP and a maximum sending rate of the first QP, where the instant rate of the first QP represents a quantity of packets that are sent between the first QP and a first QP' within a unit time, and the maximum sending rate of the first QP represents a preset maximum quantity of packets that are allowed to be sent between the first QP and the first QP' within the unit time; determining an adjustment rate of the first QP based on the instant rate of the first QP and the maximum sending rate of the first QP; and sending a congestion notification packet to the first device, where the congestion notification packet carries the adjustment rate of the first QP.

Optionally, the storage device is further configured to determine the adjustment rate of the first QP based on the instant rate of the first QP, a weight coefficient corresponding to a priority of the first device, and the maximum sending rate of the first QP; or determine the adjustment rate of the first QP based on the instant rate of the first QP, the maximum sending rate of the first QP, and a weight coefficient corresponding to a priority of a virtual machine bound to the first QP; or determine the adjustment rate of the first QP based on the instant rate of the first QP, the maximum sending rate of the first QP, a priority of the first device, and a weight coefficient corresponding to a priority of a virtual machine bound to the first QP.

Optionally, each of at least one third device further establishes at least one QP between the storage device and each of the at least one third device based on a RoCE protocol, and the first device and the third device include m QPs; and the storage device is configured to: determine the adjustment rate $S_1$ of the first QP by using a formula $$S_1 = D \frac{A_1/C_1}{\sum_{i=1}^{m} A_i/C_i}$$

and based on the instant rate $A_1$ of the first QP the maximum sending rate $C_1$ of the first QP, and a port rate D during congestion of the switch, where $A_i$ indicates an instant rate of an $i^{th}$ QP of the m QPs, $C_i$ indicates a maximum sending rate of the $i^{th}$ QP of the m QPs, m is a positive integer, and i is a positive integer ranging from 1 to m.

In this embodiment, the third device may be the second server or the third server in the architecture shown in FIG. 1.

Optionally, each of at least one third device further establishes at least one QP between the storage device and each of the at least one third device based on a RoCE protocol, and the first device and the third device include m QPs; and the storage device is configured to: determine the adjustment rate $S_1$ of the first QP by using a formula $$S_1 = DB_1 \frac{A_1/C_1}{\sum_{i=1}^{m} A_i/C_i}$$

and based on the instant rate $A_1$ of the first QP, the weight coefficient $B_1$ corresponding to the priority of the first server, the maximum sending rate $C_1$ of the first QP, and a port rate D during congestion of the switch, where $A_i$ indicates an instant rate of an $i^{th}$ QP of the m QPs $C_i$ indicates a maximum sending rate of the $i^{th}$ QP of the m QPs, m is a positive integer, and i is a positive integer ranging from 1 to m.

Optionally, the storage device is further configured to: receive the first packet that is from the first QP of the first device and that is forwarded by using the switch, read an ECN flag bit of the first packet, determine that the ECN flag bit of the first packet indicates that network congestion occurs on the switch, and obtain the instant rate of the first QP and the maximum sending rate of the first QP.

The processor 501 may be a CPU, or may be another general-purpose processor, a digital signal processor (DSP), an ASIC, an FPGA or another programmable logic device, a discrete gate or transistor logic device, a discrete hardware component, or the like. The general-purpose processor may be a microprocessor, may be any conventional processor, or the like.

The memory 502 may include a read-only memory and a random access memory, and provides an instruction and data to the processor 501. The memory 502 may further include a non-volatile random access memory. For example, the memory 502 may further store device type information.

The memory 502 may be a volatile memory or a non-volatile memory, or may include both a volatile memory and a non-volatile memory. The non-volatile memory may be a read-only memory (ROM), a programmable ROM (PROM), an erasable PROM (EPROM), an electrically erasable PROM (EEPROM), or a flash memory. The volatile memory may be a random-access memory (RAM), used as an external cache. For example but not for limitation, many forms of RAMs are available, for example, a static RAM (SRAM), a dynamic RAM (DRAM), a synchronous DRAM (SDRAM), a double data rate SDRAM (DDR SDRAM), an enhanced SDRAM (ESDRAM), a synchlink DRAM (SLDRAM), and a direct Rambus RAM (DR RAM).

The bus 504 may further include a power bus, a control bus, a status signal bus, and the like, in addition to a data bus. However, for clarity of description, various buses are marked as the bus 504 in the figure.

The storage device may correspond to the packet sending apparatus shown in FIG. 4, and may correspond to a corresponding body for performing the packet sending method in FIG. 2 and FIG. 3. In addition, the foregoing operations and/or functions and other operations and/or functions of the modules in the storage device are respectively for the purpose of implementing corresponding procedures of the methods in FIG. 2 and FIG. 3. For brevity, details are not described herein.

According to the storage device provided in this embodiment, an adjustment rate at which a server sends a packet is determined based on an instant rate at which the server sends the packet and a corresponding maximum sending rate at which the server sends the packet, and a sending rate of each QP is adjusted based on a different status of the QP, thereby relieving congestion of the data transmission system, and avoiding affecting service processing capabilities of the virtual machine and the server. Further, when determining the adjustment rate, the network interface card considers priorities of the virtual machine and/or the server. Different rate reducing policies are used for users having different priorities. A packet of a QP corresponding to a service requirement having a high priority is preferentially processed.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded or executed on the computer, the procedures or functions according to the embodiments are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a Digital Versatile Disc (DVD)), a semiconductor medium, or the like. The semiconductor medium may be a solid-state drive (SSD).

A person of ordinary skill in the art may be aware that, the units and algorithm steps in the examples described with reference to the embodiments disclosed in this specification may be implemented by electronic hardware or a combination of computer software and electronic hardware. Whether the functions are performed by hardware or software depends on particular applications and design constraints of the technical solutions. A person skilled in the art may use different methods to implement the described functions for each particular application.

It may be clearly understood by a person skilled in the art that, for the purpose of convenient and brief description, for a detailed working process of the system, apparatus, and unit, refer to a corresponding process in the method embodiments. Details are not described herein again.

In the several embodiments provided, the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

The foregoing descriptions are merely specific implementations. Any variation or replacement readily figured out by a person skilled in the art based on the specific implementations provided shall fall within the protection scope of this disclosure.

What is claimed is:

1. A packet sending method implemented by a second device and comprising:
   receiving, from a first device and using an RDMA over Converged Ethernet (RoCE) protocol, a first packet;
   obtaining, in response to the first packet, a first instant rate of a first queue pair (QP) and a first maximum sending rate of the first QP, wherein the first instant rate represents a quantity of packets that are sent between the first QP and a first QP' within a unit time, wherein the first QP' is associated with the first QP, and wherein the first maximum sending rate represents a preset maximum quantity of packets that are allowed to be sent between the first QP and the first QP' within the unit time;
   identifying an adjustment rate of the first QP based on the first instant rate and the first maximum sending rate; and
   sending, to the first device, a congestion notification packet comprising the adjustment rate.

2. The packet sending method of claim 1, further comprising further identifying the adjustment rate based on a weight coefficient corresponding to a priority of the first device.

3. The packet sending method of claim 1, further comprising further identifying the adjustment rate based on a weight coefficient corresponding to a priority of a virtual machine bound to the first QP.

4. The packet sending method of claim 1, further comprising further identifying the adjustment rate based on a priority of the first device and a weight coefficient corresponding to a priority of a virtual machine bound to the first QP.

5. The packet sending method of claim 1, further comprising further identifying the adjustment rate using the following formula:

$$S_1 = D \frac{A_1/C_1}{\sum_{i=1}^{m} A_i/C_i},$$

wherein $S_1$ is the adjustment rate, D is a port rate during congestion of a switch, $A_1$ is the first instant rate, $C_1$ is the first maximum sending rate, $A_i$ is an instant rate of an $i^{th}$ QP of m QPs, $C_i$ is a maximum sending rate of the $i^{th}$ QP, m is a positive integer, and i is a positive integer ranging from 1 to m.

6. The packet sending method of claim 1, further comprising further identifying the adjustment rate using the following formula:

$$S_1 = DB_1 \frac{A_1/C_1}{\sum_{i=1}^{m} A_i/C_i},$$

wherein $S_1$ is the adjustment rate, D is a port rate during congestion of a switch, $B_1$ is a weight coefficient corresponding to a priority of the first device, $A_1$ is the first instant rate, $C_1$ is the first maximum sending rate of the first QP, $A_i$ is an instant rate of an $i^{th}$ QP of m QPs, $C_i$ is a maximum sending rate of the $i^{th}$ QP, m is a positive integer, and i is a positive integer ranging from 1 to m.

7. The packet sending method of claim 1, wherein before obtaining the first instant rate and the first maximum sending rate, the packet sending method further comprises:
   reading an explicit congestion notification (ECN) flag bit of the first packet; and
   identifying that the ECN flag bit indicates that network congestion occurs on a switch.

8. A storage device comprising:
   a memory configured to store instructions; and
   a processor coupled to the memory and configured to execute the instructions to:
      receive, from a first device and using an RDMA over Converged Ethernet (RoCE) protocol, a first packet;
      obtain, in response to the first packet, a first instant rate of a first queue pair (QP) and a first maximum sending rate of the first QP, wherein the first instant rate represents a quantity of packets that are sent between the first QP and a first QP' within a unit time, wherein the first QP' is associated with the first QP, and wherein the first maximum sending rate represents a preset maximum quantity of packets that are allowed to be sent between the first QP and the first QP' within the unit time;
      identify an adjustment rate of the first QP based on the first instant rate and the first maximum sending rate; and send, to the first device, a congestion notification packet comprising the adjustment rate.

9. The storage device of claim 8, wherein the processor is further configured to further identify the adjustment rate based on a weight coefficient corresponding to a priority of the first device.

10. The storage device of claim 8, wherein the processor is further configured to further identify the adjustment rate based on a weight coefficient corresponding to a priority of a virtual machine bound to the first QP.

11. The storage device of claim 8, wherein the processor is further configured to further identify the adjustment rate based on a priority of the first device and a weight coefficient corresponding to a priority of a virtual machine bound to the first QP.

12. The storage device of claim 8, wherein the processor is further configured to further identify the adjustment rate using the following formula:

$$S_1 = D \frac{A_1/C_1}{\sum_{i=1}^{m} A_i/C_i},$$

wherein $S_1$ is the adjustment rate, D is a port rate during congestion of a switch, $A_1$ is the first instant rate, $C_1$ is the first maximum sending rate, $A_i$ is an instant rate of an $i^{th}$ QP of m QPs, $C_i$ is a maximum sending rate of the $i^{th}$ QP, m is a positive integer, and i is a positive integer ranging from 1 to m.

13. The storage device of claim 8, wherein the processor is further configured to further identify the adjustment rate using the following formula:

$$S_1 = DB_1 \frac{A_1/C_1}{\sum_{i=1}^{m} A_i/C_i},$$

wherein $S_1$ is the adjustment rate, D is a port rate during congestion of a switch, $B_1$ is a weight coefficient corresponding to a priority of the first device, $A_1$ is the first instant rate, $C_1$ is the first maximum sending rate of the first QP, $A_i$ is an instant rate of an $i^{th}$ QP of m QPs, $C_i$ is a maximum sending rate of the $i^{th}$ QP of the m QPs, m is a positive integer, and i is a positive integer ranging from 1 to m.

14. The storage device of claim 8, wherein before obtaining the first instant rate and the first maximum sending rate, the processor is further configured to:
- read an explicit congestion notification (ECN) flag bit of the first packet; and
- identify that the ECN flag bit indicates that network congestion occurs on a switch.

15. A computer program product comprising instructions for storage on a non-transitory medium and that, when executed by a processor, cause a storage device to:
- receive, from a first device and using an RDMA over Converged Ethernet (RoCE) protocol, a first packet;
- obtain, in response to the first packet, a first instant rate of a first queue pair (QP) and a first maximum sending rate of the first QP, wherein the first instant rate represents a quantity of packets that are sent between the first QP and a first QP' within a unit time, wherein the first QP' is associated with the first QP, and wherein the first maximum sending rate represents a preset maximum quantity of packets that are allowed to be sent between the first QP and the first QP' within the unit time;
- identify an adjustment rate of the first QP based on the first instant rate and the first maximum sending rate; and
- send, to the first device, a congestion notification packet comprising the adjustment rate.

16. The computer program product of claim 15, wherein the instructions further cause the storage device to further identify the adjustment rate based on a weight coefficient corresponding to a priority of the first device.

17. The computer program product of claim 15, wherein the instructions further cause the storage device to further identifying the adjustment rate based on a weight coefficient corresponding to a priority of a virtual machine bound to the first QP.

18. The computer program product of claim 15, wherein the instructions further cause the storage device to further identify the adjustment rate based on a priority of the first device, and a weight coefficient corresponding to a priority of a virtual machine bound to the first QP.

19. The computer program product of claim 15, wherein the instructions further cause the storage device to further identify the adjustment rate using the following formula:

$$S_1 = D \frac{A_1/C_1}{\sum_{i=1}^{m} A_i/C_i},$$

wherein $S_1$ is the adjustment rate, D is a port rate during congestion of a switch, $A_1$ is the first instant rate, $C_1$ is the first maximum sending rate, $A_i$ is an instant rate of an $i^{th}$ QP of m QPs, $C_i$ is a maximum sending rate of the $i^{th}$ QP, m is a positive integer, and i is a positive integer ranging from 1 to m.

20. The computer program product of claim 15, wherein the instructions further cause the storage device to further identify the adjustment rate using the following formula:

$$S_1 = DB_1 \frac{A_1/C_1}{\sum_{i=1}^{m} A_i/C_i},$$

wherein $S_1$ is the adjustment rate, D is a port rate during congestion of a switch, $B_1$ is a weight coefficient corresponding to a priority of the first device, $A_1$ is the first instant rate, $C_1$ is the first maximum sending rate, $A_i$ is an instant rate of an $i^{th}$ QP of m QPs, $C_i$ is a maximum sending rate of the $i^{th}$ QP, m is a positive integer, and i is a positive integer ranging from 1 to m.

* * * * *